Figure 1:
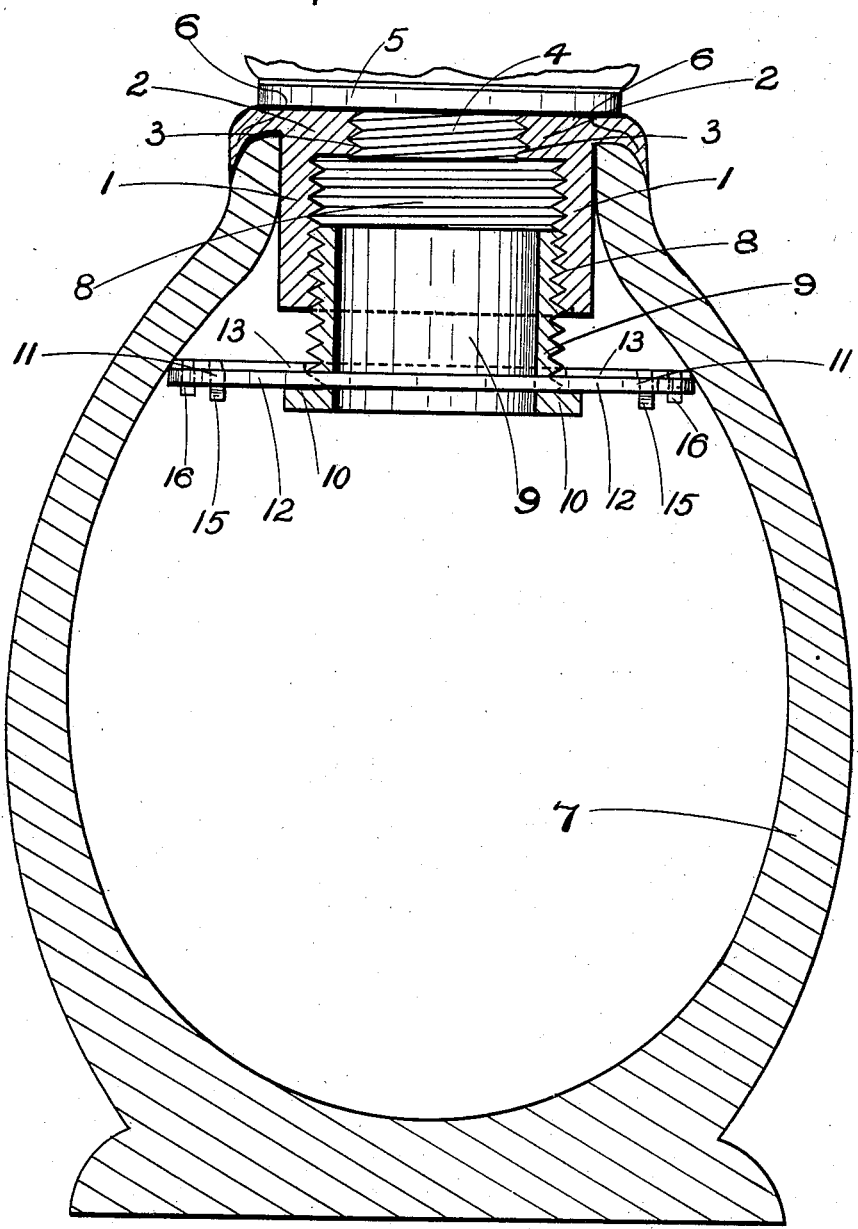

No. 824,729. PATENTED JULY 3, 1906.
R. W. LAWRENCE.
LAMP.
APPLICATION FILED MAR. 27, 1906.

2 SHEETS—SHEET 1.

WITNESSES
W. P. Burke
W. J. Donovan

INVENTOR
Richard William Lawrence
BY Richard
ATTYS

No. 824,729. PATENTED JULY 3, 1906.
R. W. LAWRENCE.
LAMP.
APPLICATION FILED MAR. 27, 1906.
2 SHEETS—SHEET 2.
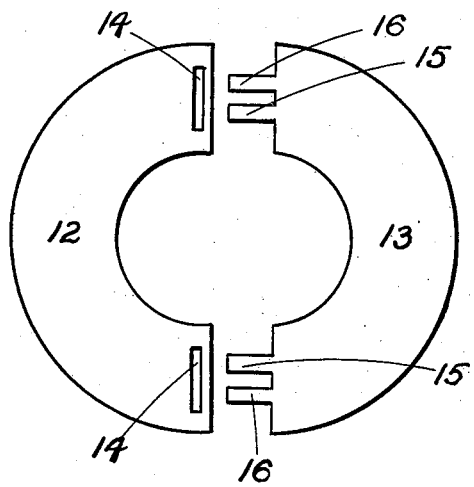
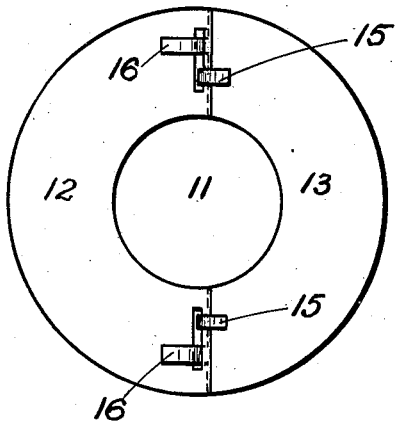
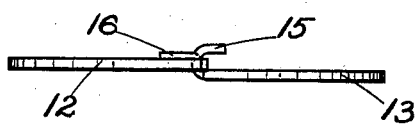
WITNESSES
W. P. Burke
W. J. Donovan
INVENTOR
Richard William Lawrence
BY Richards
ATTYS

UNITED STATES PATENT OFFICE.

RICHARD WILLIAM LAWRENCE, OF DUNEDIN, NEW ZEALAND.

LAMP.

No. 824,729.

Specification of Letters Patent.

Patented July 3, 1906.

Application filed March 27, 1906. Serial No. 308,257.

*To all whom it may concern:*

Be it known that I, RICHARD WILLIAM LAWRENCE, a subject of the King of Great Britain, residing at Dunedin, New Zealand, have invented new and useful Improvements in Lamps, of which the following is a specification.

My invention relates to means for attaching to lamp-bowls lamp-burner sockets of the class which have an external flange taking over the mouth of the lamp-bowl.

The socket is usually secured on the mouth of the lamp-bowl by a cement of plaster-of-paris or the like. The socket when so secured frequently becomes loose and falls out of position, and when this occurs difficulty is found in fixing it again. According to my invention the burner-socket is not a fixture, and no cement is required; but the socket is peculiarly formed and has attachments whereby it can be readily fixed and tightened up when required.

My invention is applicable to lamp-bowls made of any material, provided they taper at or toward the mouth.

In the accompanying drawings similar numerals of reference indicate similar parts.

Figure 1 is a sectional side elevation of my invention applied to a lamp. Fig. 2 is a reverse plan of the two members of the washer before being hinged together. Fig. 3 is a reverse plan of the washer. Fig. 4 is an edge view of the washer.

Referring to Fig. 1, the socket 1 has its upper portion formed with a downwardly-curved outward flange 6, adapted to take over the mouth of the lamp-bowl, and with an inward flange 2, internally threaded, 3, to receive the externally-threaded shank 4 of the burner 5. The portion of the socket 1 below the flange 2 is of enlarged diameter and is internally threaded, 8, to receive an externally-threaded sleeve 9, having an outward flange 10 supporting the washer 11. This flange must be of larger diameter than the mouth of the lamp-bowl, and in order that it may be inserted therein it is made collapsible by being formed of two members 12 13, (see Figs. 2, 3, and 4,) which when hinged together form a circular washer adapted to fit over the sleeve 9 and rest on the flange 10 thereof. The hinge is so constructed that though the washer may be collapsed for the purpose of inserting it within the lamp-bowl it will, if properly placed in position on the flange 10, remain rigid under an upward pull, when it impinges upon the lamp-bowl. This is effected by making one member 12 of the washer with a transverse slot 14 at each end, the other member 13 being provided at each end with tongues 15 15 and 16 16, which are adapted to be passed through the slots 14. The inner tongues 15 15 are bent backward and form the hinge proper, and the outer tongues 16 16 lie flat on the surface of the member 12, as shown in Figs. 3 and 4, and prevent the washer collapsing in the wrong direction.

To attach the lamp-burner socket to the lamp-bowl, the washer 11 is collapsed by folding over the two members and is lowered into the body of the lamp-bowl, where it is opened out and placed over the sleeve 9, with the surface shown in Fig. 3 facing toward the bottom of the lamp-bowl, this being the correct position to insure the washer not collapsing under an upward pull. The sleeve 9, with the washer 11 resting on the flange 10, is then drawn up, and the socket 1 is screwed onto the sleeve 9, drawing it up until the washer 11 impinges upon the sides of the lamp-bowl and holds the socket firmly in position. The burner 5 may then be screwed into position, as shown in Fig. 1.

Having now described my invention, what I claim as new, and desire to secure by Letters Patent, is—

1. In combination with a lamp-bowl tapering at or toward its mouth; a burner socket-piece having an external flange engaging said lamp-bowl an upper portion adapted to receive the burner-shank an internally-threaded lower portion, an externally-threaded sleeve screwing into said lower portion, an outward flange on the lower end of said sleeve and a washer loosely resting on said flange substantially as and for the purposes set forth.

2. In combination with a lamp-bowl tapering at or toward its mouth; a burner socket-piece having an external flange engaging said lamp-bowl, an upper portion adapted to receive the burner-shank, an internally-threaded lower portion of greater diameter than said upper portion, an externally-threaded sleeve screwing into said lower portion, an outward flange on said sleeve and a washer adapted to be entered within said lamp-bowl and rest on said flange said washer being adapted to impinge upon the sides of said lamp-bowl and be then rigid against an upward pull substantially as and for the purposes set forth.

3. In combination with means for attaching lamp-burner sockets to lamp-bowls, a washer consisting of two members, said members being hinged together by tongues on one member entering slots in the other member, some of said tongues being turned back after passing through said slots and others of said tongues lying flat on the surface of the slotted member after passing through said slots substantially as and for the purposes set forth.

In witness whereof I have hereunto set my hand in presence of two witnesses.

RICHARD WILLIAM LAWRENCE.

Witnesses:
 A. J. PARK,
 AUDREY JACKSON.